(Model.)
H. C. REGISTER.
DENTAL ENGINE HAND PIECE.
No. 250,677. Patented Dec. 13, 1881.
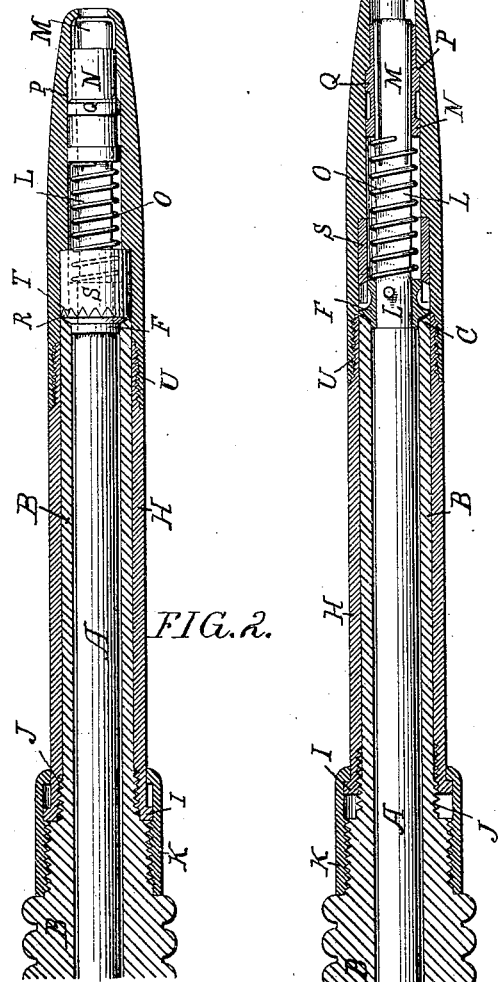
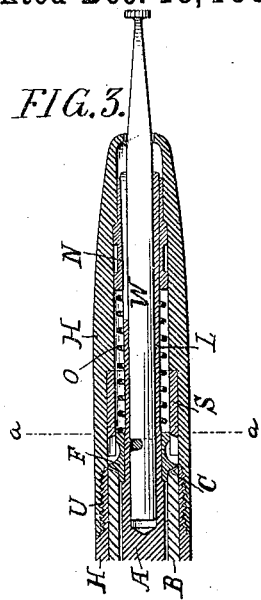
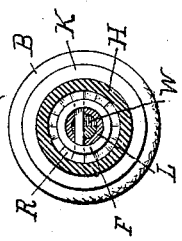
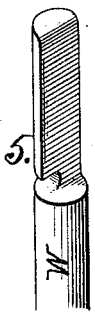
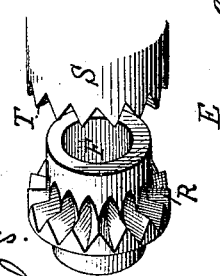
Witnesses,
John K. Rupertus.
Inventor,
Henry C. Register
By his Attorneys,
W. C. Strawbridge
Bonsall Taylor.

UNITED STATES PATENT OFFICE.

HENRY C. REGISTER, OF PHILADELPHIA, PENNSYLVANIA.

DENTAL-ENGINE HAND-PIECE.

SPECIFICATION forming part of Letters Patent No. 250,677, dated December 13, 1881.

Application filed March 28, 1881. (Model.)

*To all whom it may concern:*

Be it known that I, HENRY C. REGISTER, of Philadelphia, Pennsylvania, have invented an Improvement in Dental-Bit Holders or Hand-Pieces for Burrs and other Instruments, of which the following is a specification.

My invention relates to the class of holders or hand-pieces which are employed in connection with dental engines of various kinds, and are designed to receive the burr or bit and to enable its attachment to the driven spindle of the flexible shaft, its object being the construction of a universal tool-holder mechanically simple both in parts and method of operation.

In the accompanying drawings, Figure 1 is a central longitudinal section of a hand-piece embodying my improvements with the bit in place in the spring-clamp jaws, the latter not being in section. Fig. 2 is a similar view of the same, with the exception that the sliding collar of the spring-clamp jaws and the clutch are not sectioned and that the bit is not in place, although the parts are in position to receive it. Fig. 3 is a similar view of the front portion or nose-piece of the rotatable casing of the hand-piece, the spring-clamp jaws, collar, spring, and clutch being in section, but the bit, although in place, not being sectioned; Fig. 4, a transverse section on the line $a\ a$ of Fig. 3, looking from the nose or front end of the rotatable casing. Fig. 5 is a perspective detail of the bit-shank; and Fig. 6, a similar and greatly-magnified view of the ratchet-clutch, the parts of which are supposed removed from the hand-piece.

Similar letters of reference indicate corresponding parts.

In the accompanying drawings, A represents the driven spindle of the hand-piece, by the rotation of which the bit is revolved. The spindle is journaled within an inner hollow tubular spindle-casing, B, which has two cone-bearings, C and D, respectively formed near its outer and inner ends. The journaling of the driven spindle is effected by means of two angularly-faced rings affixed to the spindle, E being the inner ring, and being adjustably connected with the spindle in any convenient manner, so as to be adapted to be moved endwise thereupon to enable adjustment to compensate for wear.

F is the outer ring, hereinafter termed the "clutch-ring," which is rigidly affixed upon the spindle near its forward extremity, and which is shown in detail in Fig. 6.

G is a tubular cover, threaded upon the inner or spindle casing near the rear thereof, and adapted to be removed to enable the setting of the inner pivot-ring. When in place this cover forms the rear portion of the hand-piece.

H is a rotatable tubular casing exterior to the fixed tubular casing B. It is conveniently made in two sections, threaded together at U, is tapered at its outer extremity, accurately fitted around the inner casing, so as to be capable of being rotated and moved endwise thereupon, and provided with an annular and outwardly-projecting shoulder, I, at its inner extremity. At said inner extremity the rotatable casing is internally threaded, so as to screw upon a thread, J, formed at about the middle of the inner casing, or the exterior face thereof, and above the point at which said inner casing is enlarged in diameter, so as to receive a cap, K, which screws upon said enlarged portion of said inner casing, embraces the shoulder I of the rotatable outer casing, as shown, and by reason of its threaded connection forms a regulating device, whereby the extent of rotation, and consequently of endwise movement, of said outer casing is controlled. The threading together of the two casings gives to the outer an endwise movement upon the inner.

The front extremity of the spindle is connected with or formed into three or more spring-clamp jaws, M, which receive within them any desired form of bit. The spring-jaws M ordinarily stand apart from each other, but are adapted to be forced together and upon the bit by means of a sliding collar, N, fitted around and adapted to slide endwise upon them. Between the outer shoulder of the clutch-ring F, as a convenient abutment, and the inner annular face of this sliding collar, around the spring-clamp jaws, is placed a spiral spring, O, which abuts between the ring and collar, and which, when uncontrolled, operates to slide the collar forward upon the spring-clamp jaws so as to cause them to be clamped. A circular bead, Q, upon the exterior of the collar (or, if desired, the front face of the collar) is beveled off so as to register when the collar is pushed forward by the spring against a correspondingly-beveled internal annular shoulder, P, formed upon the inside of the front or nose portion of the outer rotatable casing. This bead Q forms not only a device whereby, when the outer casing is screwed in, the collar is forced back so as to release the spring-clamp jaws and compress the spring, but also forms a cone-bearing, which holds and steadies the driven spindle at a point near its front extremity, where it is formed into and terminated in the spring-clamp jaws referred to—a construction of journal-bearings never heretofore existing in dental hand-pieces. When, therefore, the outer rotatable casing, H, is screwed in upon the inner or spindle casing, the action of its shoulder P is to force the sliding collar inwardly, and thereby permit the expansion or opening of the spring-clamp jaws and the introduction or removal of the tool, the spiral spring being compressed in the above action. When, on the contrary, the outer casing, H, is unscrewed with respect to the inner casing, the spiral acts to cause the sliding collar to follow said retreating nose-piece, and thereby compress the spring-clamp jaws and engage the tool which has been previously entered within the jaws.

The front face of the clutch-ring F is provided with ratchets or teeth R, while within the rotatable outer casing is, for convenience of manufacture, fitted what I term a "minor cylinder," S, the inner edge of which is provided with a corresponding series of teeth, T. The minor cylinder is rigid within the outer casing, so that when the latter is screwed in the minor cylinder moves with it until its teeth engage with the teeth on the clutch-ring, and thereby occasion the stoppage of the spindle to which said clutch-ring is keyed synchronously with the opening of the spring-jaws by the completion of the inward movement of the sliding collar.

While I have specified what I term a "minor cylinder," fitted rigidly within the outer casing, as being provided with the teeth which engage those of the clutch-ring and occasion the stoppage of the spindle, I yet desire it understood that this cylinder is simply a workshop expedient, as the teeth may be directly formed or cut into the metal or substance of the interior of the outer casing. Upon the unscrewing or retreat of the outer casing the action is reversed, the spring-clamp jaws clamped by the advance of the collar under stress of the recoil of the spring, and the spindle set free to rotate (when next actuated) by the retreat of the minor cylinder and the consequent separation of the teeth of the clutch.

It is obvious that by means of the cap K a very nice adjustment of the throw of the outer casing may be had. The spring always compensates itself to any predetermined endwise movement of the sliding collar.

The advantages of the hand-piece are that it is equally well adapted for use with any form of bit or tool, no special construction of bit-shank being required; that the revolving spring-clamp jaws are steadied in revolution near their forward extremities by the cone journal-bearing formed between the collar and outer casing; that the outer casing, being entire and free from orifices or apertures of any character, prevents the escape of oil from the lubricated surfaces to soil the hands of the operator, and that the simplicity of parts lessens the danger of the tool's getting out of order, breaking, or failing to act.

The gist of my invention lies in the actuation of the collar endwise upon the spring-jaws, and while this result is best attained by the alternate endwise movement of the outer casing occasioning the compression of the spring and enabling its recoil, it is yet obvious that a skillful mechanic could so adapt the device that, while the outer casing might be stationary and the inner casing made to rotate, yet the same result would ensue; that the position of the spring and collar might be reversed; that a spline, circular feather, or other connection might be substituted for the shoulder and bead on the outer casing and collar; that the spring might be replaced, or that a friction or other clutch might be substituted for the toothed clutch, all of which could be done without departing from the spirit and substance of the invention, but merely by the exercise of mechanical skill in the substitution of allied mechanical expedients for those adopted by me.

Having thus described my invention, I claim and desire to secure by Letters Patent of the United States—

1. In a dental hand-piece, the combination, substantially as before set forth, of a driven spindle revolving within a casing, the front extremity of which spindle is connected with or formed into a tool-holder composed of spring-clamp jaws, a sliding collar surrounding and free to move endwise upon said clamp-jaws, a collar-actuating spring, one end of which abuts against the sliding collar and the other against a fixed bearing within the hand-piece, and an outer rotatable casing which has an endwise movement with respect to the casing within which the spindle revolves, and which registers by means of a circular shoulder, spline, or kindred contrivance against the sliding collar, whereby, upon the endwise movement of the outer casing in one or the other direction, the collar is likewise moved and the spring-clamp jaws clamped upon or released from the tool.

2. In a dental hand-piece, the combination, with a driven spindle revolving within a suitable casing and provided upon its exterior with a series of ratchet-teeth, of an outer casing having an endwise movement with respect to the casing within which the spindle revolves, and provided upon its interior with a corresponding series of ratchet-teeth, whereby, upon the endwise movement of the outer casing in one or the other direction, the respective ratchet-teeth are engaged or disengaged and the spindle locked or set free to revolve, substantially as set forth.

3. In a dental hand-piece, the combination, substantially as before set forth, of a spindle-casing within which the spindle revolves, an outer casing having an endwise movement on said spindle-casing, and an adjustable screw-cap, whereby the extent of endwise movement is made adjustable at will.

4. In a dental hand-piece, the combination, substantially as before set forth, of a revolving spring-clamp-jawed tool-holder, a conical face or bead upon a sliding collar, which surrounds and has an endwise movement on said spring-clamp jaws, a correspondingly conical or angularly-faced shoulder or projection on the interior of the outer casing, which incloses and actuates in one direction said sliding collar, and a spiral spring which retains the conical faces of the collar and casing in contact, whereby a constantly-adjusted journal-bearing is formed around the spring-jaws of the tool-holder at a point in proximity to the operative end of the hand-piece.

5. In a dental hand-piece, the combination, substantially as before set forth, of a revolving spring-clamp-jawed tool-holder, a conical face or bead upon a sliding collar which surrounds and has an endwise movement on said spring clamp jaws, and a correspondingly conical or angularly-faced shoulder or projection on the interior of the outer casing, which incloses said sliding collar, whereby a journal-bearing is formed around the spring-jaws of the tool-holder at a point in proximity to the operative end of the hand-piece.

In testimony whereof I have hereunto signed my name this 19th day of March, 1881.

HENRY C. REGISTER.

In presence of—
 J. BONSALL TAYLOR,
 W. C. STRAWBRIDGE.